US012030346B2

(12) United States Patent
Sato

(10) Patent No.: US 12,030,346 B2
(45) Date of Patent: Jul. 9, 2024

(54) PNEUMATIC TIRE

(71) Applicant: The Yokohama Rubber Co., LTD., Tokyo (JP)

(72) Inventor: Shun Sato, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 666 days.

(21) Appl. No.: 17/270,628

(22) PCT Filed: Aug. 16, 2019

(86) PCT No.: PCT/JP2019/032154

§ 371 (c)(1),
(2) Date: Feb. 23, 2021

(87) PCT Pub. No.: WO2020/045130

PCT Pub. Date: Mar. 5, 2020

(65) Prior Publication Data

US 2021/0260930 A1 Aug. 26, 2021

(30) Foreign Application Priority Data

Aug. 30, 2018 (JP) ................................ 2018-161361

(51) Int. Cl.
*B60C 11/13* (2006.01)
*B60C 11/03* (2006.01)

(52) U.S. Cl.
CPC ........ *B60C 11/0309* (2013.01); *B60C 11/033* (2013.01); *B60C 11/1353* (2013.01); *B60C 2011/0344* (2013.01); *B60C 2011/0346* (2013.01); *B60C 2011/0351* (2013.01); *B60C 2011/0355* (2013.01); *B60C 2011/0362* (2013.01); *B60C 2011/133* (2013.01); *B60C 2200/14* (2013.01)

(58) Field of Classification Search
CPC ............ B60C 11/0306; B60C 11/0309; B60C 11/1353; B60C 11/033; B60C 2011/0362; B60C 2011/133; B60C 2200/06
See application file for complete search history.

(56) References Cited

U.S. PATENT DOCUMENTS 4,515,197 A * 5/1985 Motomura ............ B60C 11/125 152/209.27
2013/0199684 A1 8/2013 Sakamoto
2017/0050470 A1 2/2017 Kanematsu

FOREIGN PATENT DOCUMENTS

CN 103241070 A 8/2013
CN 106466995 A 3/2017
EP 2 281 698 A1 2/2011

(Continued)

*Primary Examiner* — Justin R Fischer
*Assistant Examiner* — Philip N Schwartz
(74) *Attorney, Agent, or Firm* — Thorpe North & Western

(57) ABSTRACT

A pneumatic tire includes circumferential main grooves extending in the tire circumferential direction and arranged side by side in the tire width direction and a land portion defined by the circumferential main grooves. The land portion includes notch portions extending in the tire width direction and connected to the circumferential main grooves and shallow groove portions connected to the notch portions, respectively, and terminating in the land portion. The height of the notch portions decreases continuously toward the circumferential main grooves connected thereto.

14 Claims, 9 Drawing Sheets

2
T 22B 24 23Ki CL 22A 22B T
25 30 BK PG 23Gi 23Ki 23Go Bk 30
23Ko PK 23Gi 24 23Ko
PB1 23Go 23Gi 26 25 23Ki
25 24 23Go Bk 30
TIRE CIRCUMFERENTIAL DIRECTION
30 PB2 23Ko
23Go 23Gi
BK 23Ko 23Ki 25
25 23Gi 24 Bk
BK 24 23Go
23Gi 23Ki 24 23Ko
23Ki 25
30 23Go 30
20S (20-2) 27 23Ko 20C (20-1) 20C (20-3) 20S
TIRE WIDTH DIRECTION

(56) References Cited

FOREIGN PATENT DOCUMENTS

| | | | | | |
|---|---|---|---|---|---|
| EP | 3135505 | A1 | | 3/2017 | |
| JP | 2-169306 | A | | 6/1990 | |
| JP | 2013-100063 | A | | 5/2013 | |
| JP | 2013-177114 | A | | 9/2013 | |
| JP | 2017-39407 | A | | 2/2017 | |
| WO | WO-2015167007 | A1 | * | 11/2015 | ............ B60C 11/03 |

* cited by examiner

PNEUMATIC TIRE

TECHNICAL FIELD

The present technology relates to a pneumatic tire.

BACKGROUND ART

On-road and off-road tires indented for running on bad roads and paved roads are known. For such tires, improvements in uneven wear resistance performance are required, and improvements in dry performance and wet performance are required. In general, improvement in uneven wear resistance performance is realized by increasing the ground contact area and improvement in drainage performance is realized by increasing the groove area, both being elements of a trade-off.

Japan Unexamined Patent Publication No. 2013-100063 discloses a technology for preventing an abrupt decrease in wet performance during wear while improving the uneven wear resistance performance of a shoulder block.

The technology disclosed in Japan Unexamined Patent Publication No. 2013-100063 relates to a shoulder block, and there is room for improvement in improving uneven wear resistance performance and improving drainage performance in the entire tread portion.

SUMMARY

The present technology provides a pneumatic tire with improved uneven wear resistance performance and improved drainage performance.

A pneumatic tire according to an aspect of the present technology includes two circumferential main grooves extending in a tire circumferential direction and arranged side by side in a tire width direction; and a first land portion defined by the two circumferential main grooves, the two circumferential main grooves including an inner circumferential main groove closest to a tire equatorial plane and an outer circumferential main groove provided on an outer side in the tire width direction of the inner circumferential main groove, the first land portion including a notch portion extending in the tire width direction and connected to the circumferential main groove and a shallow groove portion connected to the notch portion and terminating in the first land portion, and a height of the notch portion decreasing continuously toward the circumferential main groove connected thereto.

Preferably, the notch portion decreases continuously from a height corresponding to 5% of wear of the tire to a height corresponding to 70% of wear of the tire.

Preferably, a ratio of a depth of the notch portion to a groove depth of the circumferential main groove connected thereto is 0.50 or greater and 0.80 or smaller, and a ratio of a depth of the shallow groove portion to a depth of the notch portion connected thereto is greater than 0 and equal to or smaller than 0.2.

Preferably, a ratio of a length in the tire width direction of a planar portion of a bottom portion of the notch portion to a length in the tire width direction of the shallow groove portion is greater than 0 and equal to or smaller than 0.5.

Preferably, an angle of the notch portion with respect to a normal line of a tread contact surface is greater than 0° and equal to or less than 45°.

Preferably, the notch portion includes an inner notch portion extending in the tire width direction and connected to the inner circumferential main groove and an outer notch portion extending in the tire width direction and connected to the outer circumferential main groove, and the shallow groove portion includes an inner shallow groove portion connected to the inner notch portion and terminating in the first land portion and an outer shallow groove portion connected to the outer notch portion and terminating in the first land portion.

Preferably, in the outer notch portion and the outer shallow groove portion connected to the outer notch portion, a ratio $S1/S2$ of a projected area $S1$ of the outer shallow groove portion to a projected area $S2$ of the outer notch portion is $0.1 \leq S1/S2 \leq 0.5$.

Preferably, the pneumatic tire further includes a plurality of width direction grooves provided extending in the tire width direction between the inner circumferential main groove and the outer circumferential main groove and a block defined by the inner circumferential main groove, the outer circumferential main groove, and the plurality of width direction grooves, and a ratio $S2/S$ of the projected area $S2$ of the outer notch portion to a ground contact area S of the block is $0 < S2/S \leq 0.1$.

Preferably, in the inner notch portion and the inner shallow groove portion connected to the inner notch portion, a ratio $S3/S4$ of a projected area $S3$ of the inner shallow groove portion to a projected area $S4$ of the inner notch portion is $0.5 \leq S3/S4 \leq 0.9$.

Preferably, the pneumatic tire further includes a plurality of width direction grooves provided extending in the tire width direction between the inner circumferential main groove and the outer circumferential main groove and a block defined by the inner circumferential main groove, the outer circumferential main groove, and the plurality of width direction grooves, and a ratio $S4/S$ of a projected area $S4$ of the inner notch portion to a ground contact area S of the block is $0 < S4/S \leq 0.1$.

Preferably, a ratio $d11/D$ of a distance $d11$ in the tire width direction from an end portion of the inner notch portion close to the inner circumferential main groove to a terminating end portion of the inner shallow groove portion connected to the inner notch portion to a distance D in the tire width direction between an end portion of the inner notch portion close to the inner circumferential main groove and an end portion of the outer notch portion close to the outer circumferential main groove is 0.1 or greater and 0.3 or smaller, and a ratio $d12/D$ of a distance $d12$ in the tire width direction from an end portion of the outer notch portion close to the outer circumferential main groove to a terminating end portion of the outer shallow groove portion connected to the outer notch portion to the distance D is 0.1 or greater and 0.4 or smaller.

Preferably, a plurality of inner notch portions and a plurality of inner shallow groove portions are arranged in the tire circumferential direction, a plurality of outer notch portions and a plurality of outer shallow groove portions are arranged in the tire circumferential direction, a ratio of a misalignment amount of an arrangement of the inner notch portions to a pitch length of an arrangement of the outer notch portions is 0.1 or greater and 0.5 or smaller, and a ratio of a misalignment amount of an arrangement of the inner shallow groove portions to a pitch length of an arrangement of the outer shallow groove portions is 0.1 or greater and 0.5 or smaller.

Preferably, the pneumatic tire further includes a second land portion provided on the outer side in the tire width direction of the outer circumferential main groove; a second notch portion provided in the second land portion and terminating in the second land portion; a third land portion provided with the inner circumferential main groove interposed therebetween; a third notch portion provided in the third land portion extending in the tire width direction and connected to the inner circumferential main groove; and a shallow groove portion connected to the third notch portion and terminating in the third land portion.

The pneumatic tire according to an embodiment of the present technology can improve uneven wear resistance performance and improve drainage performance in the entire tread portion.

DETAILED DESCRIPTION

Embodiments of the present technology are described in detail below with reference to the drawings. However, the present technology is not limited by the embodiments. Constituents of the embodiment include elements that are essentially identical or that can be substituted or easily conceived by one skilled in the art. Furthermore, the plurality of modified examples described in the embodiment can be combined as desired within the scope apparent to one skilled in the art. In addition, some of the constituents may not be used in some embodiments.

Pneumatic Tire

Figure 1:
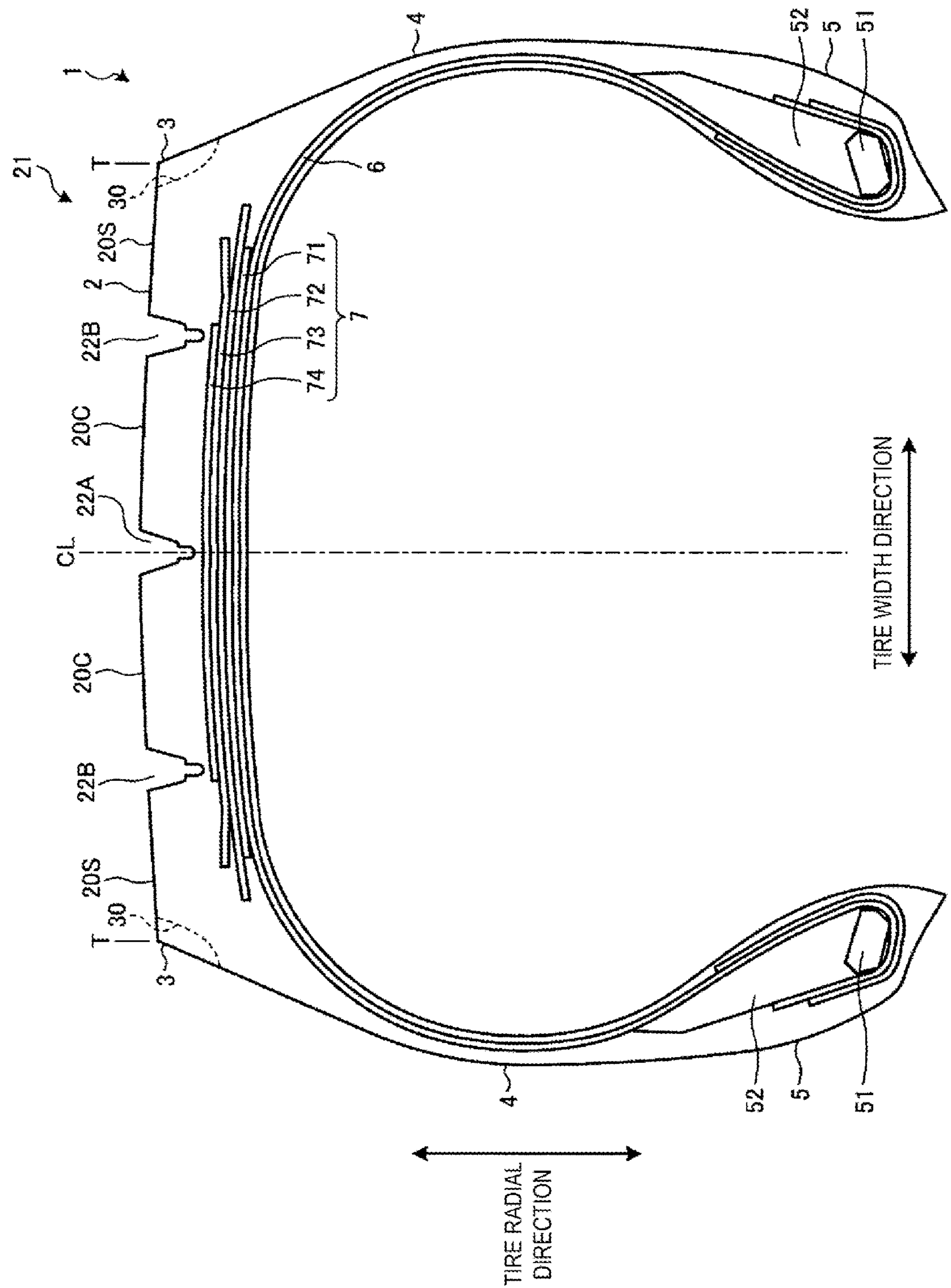
FIG. 1 is a meridian cross-sectional view of a pneumatic tire according to the present embodiment.
Figure 2:
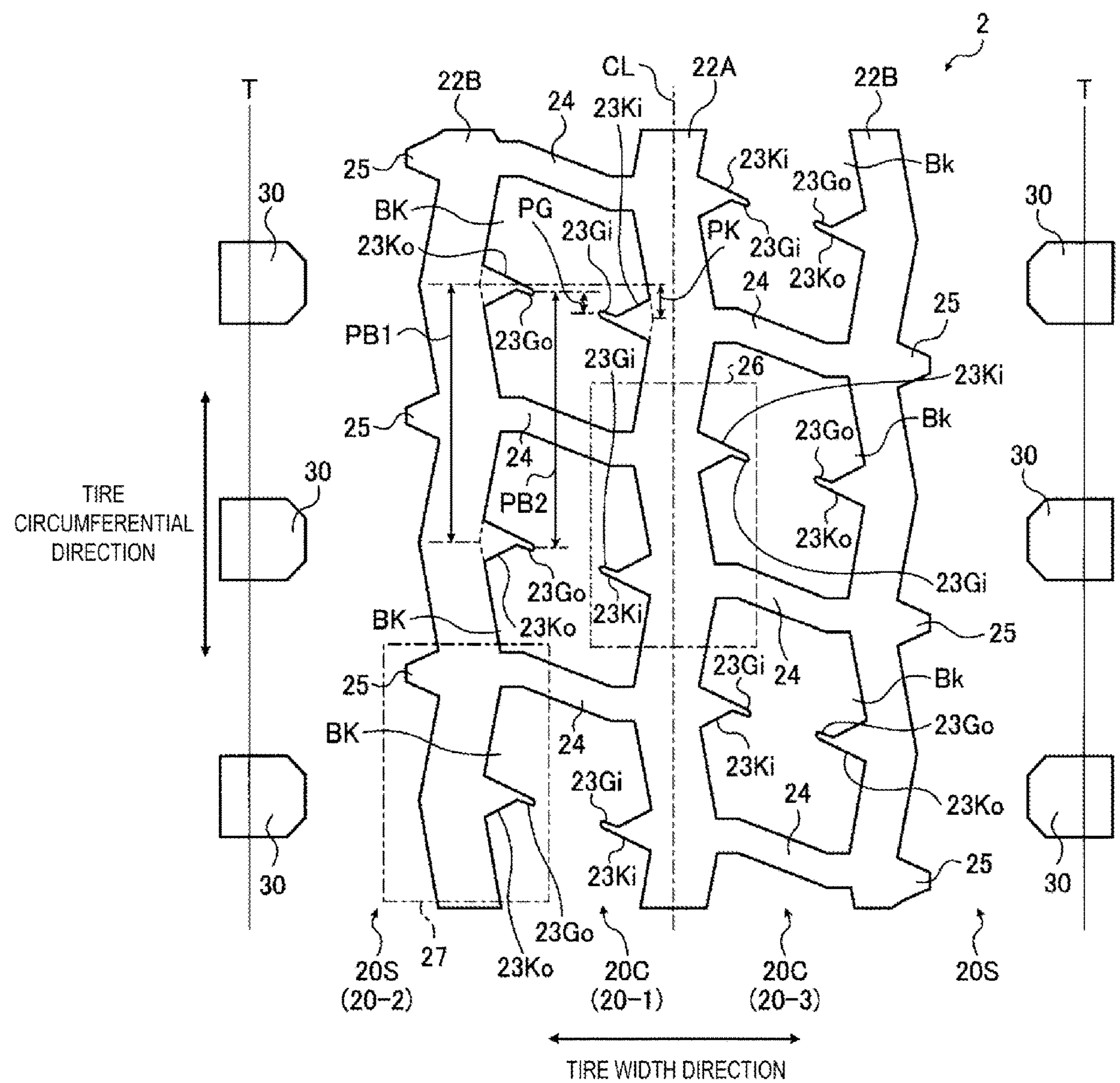
FIG. 2 is a plan view illustrating a tread surface of the pneumatic tire according to the present embodiment.

FIG. 1 is a meridian cross-sectional view of a pneumatic tire 1 according to the present embodiment. FIG. 2 is a plan view of a tread surface of the pneumatic tire 1 according to the present embodiment.

Herein, "tire radial direction" refers to the direction orthogonal to the rotation axis (not illustrated) of a pneumatic tire 1. "Inner side in the tire radial direction" refers to a side toward the rotation axis in the tire radial direction. "Outer side in the tire radial direction" refers to a side away from the rotation axis in the tire radial direction. "Tire circumferential direction" refers to the circumferential direction with the rotation axis as the center axis. Additionally, "tire width direction" refers to a direction parallel with the rotation axis. "Inner side in the tire width direction" refers to a side toward a tire equatorial plane (tire equator line) CL in the tire width direction. "Outer side in the tire width direction" refers to a side away from the tire equatorial plane CL in the tire width direction. "Tire equatorial plane CL" refers to a plane that is orthogonal to the rotation axis of the pneumatic tire 1 and that passes through a center of a tire width of the pneumatic tire 1. "Tire width" is the width in the tire width direction between components located on outer sides in the tire width direction, or in other words, the distance between the components that are the most distant from the tire equatorial plane CL in the tire width direction. "Tire equator line" refers to the line in the tire circumferential direction of the pneumatic tire 1 that lies on the tire equatorial plane CL. In the present embodiment, the tire equator line and the tire equatorial plane are denoted by the same reference sign CL.

As illustrated in FIG. 1, the pneumatic tire 1 of the present embodiment includes a tread portion 2, shoulder portions 3 on both outer sides in a tire width direction of the tread portion 2, and sidewall portions 4 and bead portions 5 continuously formed in that order from the shoulder portions 3. Furthermore, the pneumatic tire 1 includes a carcass layer 6 and a belt layer 7.

The tread portion 2 is made of a rubber material (tread rubber) and is exposed on the outermost side of the pneumatic tire 1 in the tire radial direction, with the surface thereof constituting the contour of the pneumatic tire 1. A tread surface 21 is formed on an outer circumferential surface of the tread portion 2, in other words, on a road contact surface that comes into contact with a road surface when running. A plurality (three in the present embodiment) of circumferential main grooves 22A, 22B that extend in the tire circumferential direction are provided in the tread surface 21. A plurality (four in the present embodiment) of land portions 20C, 20S defined by the plurality of circumferential main grooves 22A, 22B, extending in the tire circumferential direction, and arranged in the tire width direction are provided in the tread surface 21.

Additionally, as illustrated in FIG. 2, the tread surface 21 includes circumferential main grooves 22A, 22B extending in the tire circumferential direction and a lug groove 24 extending in a direction intersecting the circumferential main grooves 22A, 22B. The circumferential main groove 22A is the inner circumferential main groove closest to the tire equator line CL. The circumferential main groove 22B is the circumferential main groove that is second closest to the tire equator line CL. The circumferential main groove 22B is an outer circumferential main groove provided in the outer side in the tire width direction of the circumferential main groove 22A, which is the inner circumferential main groove. No other circumferential main grooves are provided between the circumferential main groove 22A and the circumferential main groove 22B. "Main groove" refers to a groove on which a wear indicator must be provided as specified by JATMA (The Japan Automobile Tyre Manufacturers Association, Inc.). Additionally, the lug grooves are lateral grooves extending in the tire width direction, and open when the tire comes into contact with the ground, and function as grooves. Note that the sipes described below are cuts formed in the tread contact surface and are distinguished from lug grooves in that the sipes are closed when the tire comes into contact with the ground.

In FIGS. 1 and 2, the tire ground contact edge T is defined as the maximum width position in the tire axial direction of the contact surface between the tire and a flat plate when the tire is mounted on a specified rim, inflated to the specified internal pressure, placed perpendicular to the flat plate in a static state, and loaded with a load corresponding to the specified load. The land portion 20S includes lug grooves 30 on the edge portion on the outer side in the tire width direction. The lug grooves 30 are provided in the land portions 20S at a predetermined pitch in the tire circumferential direction. The end portion of the lug groove 30 on the side closer to the tire equatorial plane CL terminates in the land portion 20S. The end portion of the lug groove 30 on the side farther from the tire equatorial plane CL extends beyond the tire ground contact edge T in the tire width direction and opens to the shoulder portion 3.

In FIG. 1, the shoulder portions 3 are portions of the tread portion 2 located on both outer sides in the tire width direction. Additionally, the sidewall portions 4 are exposed on the outermost sides of the pneumatic tire 1 in the tire width direction. The bead portions 5 each include a bead core 51 and a bead filler 52. The bead core 51 is formed by winding a bead wire, which is a steel wire, into an annular shape. The bead filler 52 is a rubber material disposed in a space formed when an end portion in the tire width direction of the carcass layer 6 is folded back toward the outer side in the tire width direction at the position of the bead core 51.

The end portions of the carcass layer 6 in the tire width direction are folded back around the pair of bead cores 51 from an inner side to an outer side in the tire width direction, and the carcass layer 6 is stretched in a toroidal shape in the tire circumferential direction to form the framework of the tire. The carcass layer 6 is made of coating rubber-covered carcass cords (not illustrated) disposed side by side with an angle with respect to the tire circumferential direction along the tire meridian direction at an angle with respect to the tire circumferential direction. The carcass cords are made of steel or organic fibers (polyester, rayon, nylon, or the like).

The belt layer 7 has a multilayer structure in which four layers of belts 71, 72, 73, 74 are layered, for example, and in the tread portion 2, is disposed on the outer side in the tire radial direction, which is the outer circumference, of the carcass layer 6, covering the carcass layer 6 in the tire circumferential direction. The belts 71, 72, 73, 74 are made of coating rubber-covered cords (not illustrated) disposed side by side at a predetermined angle with respect to the tire circumferential direction. The cords are made of steel or organic fibers (polyester, rayon, nylon, or the like).

The groove depth is the maximum distance from the tread contact surface to the groove bottom and is measured when the tire is mounted on a specified rim, inflated to the specified internal pressure, and in an unloaded state. Additionally, in a configuration in which the grooves include an uneven portion or sipes on the groove bottom, the groove depth is measured excluding these portions.

"Specified rim" refers to a "standard rim" defined by JATMA, a "Design Rim" defined by TRA, or a "Measuring Rim" defined by ETRTO (The European Tyre and Rim Technical Organisation. Additionally, "specified internal pressure" refers to a "maximum air pressure" defined by JATMA, to the maximum value in "TIRE LOAD LIMITS AT VARIOUS COLD INFLATION PRESSURES" defined by TRA (The Tire and Rim Association, Inc.), or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

Land Portions

As illustrated in FIG. 2, in this example, in the land portion 20C of the tread portion 2, blocks BK are defined by the circumferential main grooves 22A, 22B and the lug grooves 24 extending in the tire width direction. Instead of the lug grooves 24, the tread portion 2 may have sipes (not illustrated) extending in the tire width direction. In this case, blocks BK are defined by the circumferential main grooves 22A, the circumferential main grooves 22B, and the sipes thereof. In other words, the tread portion 2 of this example has blocks BK defined by two circumferential main grooves extending in the tire circumferential direction and width direction grooves (lug grooves 24 or sipes) extending in the tire width direction.

The blocks BK are arranged side by side in the tire circumferential direction on both sides of the tire equator line CL in the tire width direction. Therefore, the tread portion 2 of this example has land portions in which the blocks BK are arranged side by side in the tire circumferential direction.

The block BK has a notch portion 23Ki on the edge on the side closer to the tire equator line CL. A shallow groove portion 23Gi is connected to the notch portion 23Ki. In addition, the block BK has a notch portion 23Ko on the edge on the side farther from the tire equator line CL. A shallow groove portion 23Go is connected to the notch portion 23Ko. By providing the notch portion 23Ki and the shallow groove portion 23Gi, and the notch portion 23Ko and the shallow groove portion 23Go in the edge of the block BK, uneven wear resistance performance can be improved and drainage performance can be improved.

Note that instead of the blocks BK arranged side by side in the tire circumferential direction, rib-shaped land portions that are defined by the circumferential main groove 22A and the circumferential main groove 22B and provided continuously in the tire circumferential direction may be provided in the tread portion 2, and the notch portion 23Ki, the shallow groove portion 23Gi, the notch portion 23Ko, and the shallow groove portion 23Go may be provided in the edge of the land portion.

Inner Circumferential Main Groove

Figure 3:
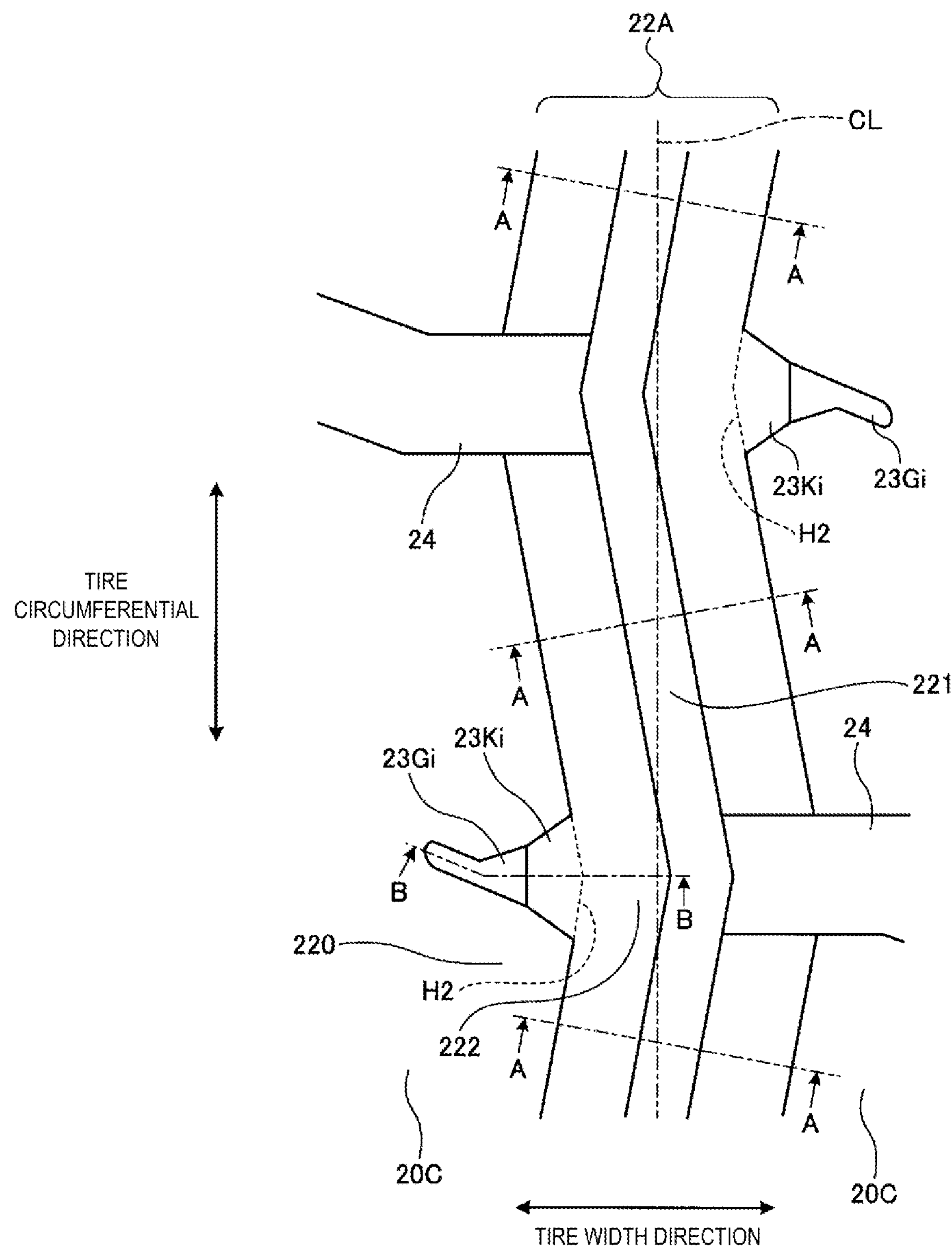
FIG. 3 is a plan view illustrating a detailed configuration of an inner circumferential main groove.

FIG. 3 is a plan view illustrating a detailed configuration of the circumferential main groove 22A, which is an inner circumferential main groove. FIG. 3 is an enlarged view of the region 26 in FIG. 2. As illustrated in FIG. 3, the circumferential main groove 22A extends in the tire circumferential direction along the tire equator line CL. Both sides of the circumferential main groove 22A are land portions 20C.

In this example, the circumferential main groove 22A has a zigzag shape that bends on one side and the other side of the tire equator line CL with the tire equator line CL as a center line. The circumferential main groove 22A is connected to the lug groove 24 in the zigzag-shaped bent portion. The land portion 20C that faces the connection portion between the circumferential main groove 22A and the lug groove 24 includes a notch portion 23Ki that connects to the circumferential main groove 22A, and a shallow groove portion 23Gi that connects to the notch portion 23Ki and terminates within the land portion 20C. Note that a dashed line H2 is an imaginary line of the circumferential main groove 22A when the circumferential main groove 22A is viewed in a plan view.

The circumferential main groove 22A has a step portion 222 between a tread contact surface 220 and a groove bottom portion 221. The step portion 222 extends in the tire circumferential direction except for the connecting portions of the circumferential main grooves 22A and the lug grooves 24.

Figure 4:
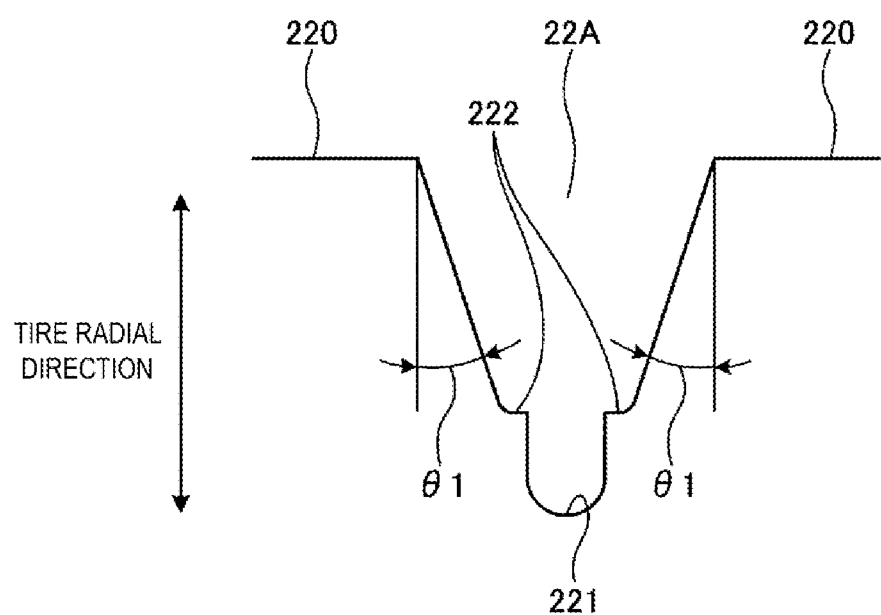
FIG. 4 is a cross-sectional view along line A-A in FIG. 3.

FIG. 4 is a diagram illustrating the structure of the circumferential main groove 22A. FIG. 4 is a cross-sectional view along line A-A in FIG. 3. As illustrated in FIG. 4, the step portion 222 is provided in the circumferential main groove 22A between the tread contact surface 220 and the groove bottom portion 221. Note that in the groove wall from the tread contact surface 220 to the step portion 222, the angle θ1 with respect to the normal line of the tread contact surface 220 is, for example, 18°.

Notch Portions and Shallow Groove Portions

Figure 5:
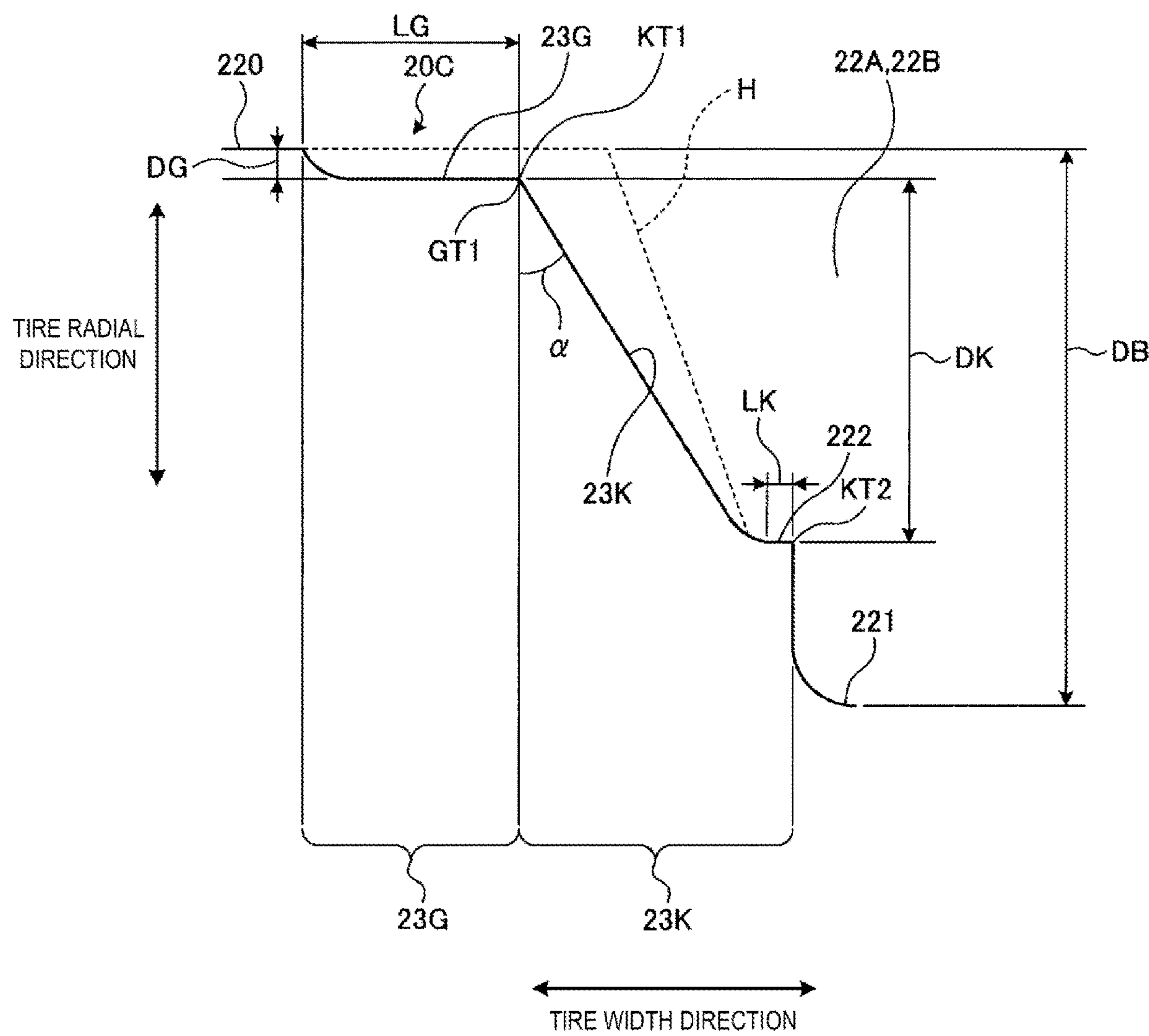
FIG. 5 is a cross-sectional view illustrating a detailed configuration of a notch portion and a shallow groove portion.

FIG. 5 is a cross-sectional view illustrating a detailed configuration of the notch portion and the shallow groove portion. FIG. 5 is a cross-sectional view along line B-B in FIG. 3. Here, the notch portion 23Ki and the notch portion 23Ko are collectively referred to as the notch portion 23K, and the shallow groove portion 23Gi and the shallow groove portion 23Go are collectively referred to as the shallow groove portion 23G.

In FIG. 5, the notch portion 23K is provided in the edge portion of the circumferential main groove 22A. The notch portion 23K extends in the tire width direction and is connected to the circumferential main groove 22A. A dashed line H in FIG. 5 illustrates the groove wall of circumferential main groove 22A. The shallow groove portion 23G is connected to the notch portion 23K and terminates in the land portion 20C, which is a first land portion.

Due to the shallow groove portion 23G extending from and connected to the notch portion 23K, the edge component increases and drainage properties are improved. Additionally, by disposing the shallow groove portion 23G instead of sipes, block rigidity can be maintained and uneven wear resistance performance and drainage performance can be achieved in a compatible manner. Note that the shallow groove portion 23G is a groove having a groove depth of 1 mm and a groove width of 0.5 mm or greater and 3.5 mm or smaller, for example.

The height of the notch portion 23K decreases continuously toward the circumferential main groove 22A connected thereto. More specifically, the height of the notch portion 23K changes continuously from an end portion KT1 on the outer side in the tire radial direction toward an end portion KT2 on the inner side in the tire radial direction, rather than changing in a step shape. The bottom portion of the notch portion 23K near the end portion KT2 is planar. In this planar portion, the notch portion 23K and the groove wall of the circumferential main groove 22A coincide with each other.

The position of the end portion KT1 on the outer side in the tire radial direction of the notch portion 23K coincides with the position of the end portion GT1 of the shallow groove portion 23G close to the notch portion 23K. The position of the end portion GT1 of the shallow groove portion 23G close to the notch portion 23K is a position at a height corresponding to 5% of wear of the tire in the tire radial direction. The position of the end portion KT2 on the inner side in the tire radial direction of the notch portion 23K coincides with the position of the end portion of the step portion 222 of the circumferential main groove 22A on the side closer to the groove bottom portion 221. The position of the end portion of the step portion 222 of the circumferential main groove 22A on the side closer to the groove bottom portion 221 is a position at a height corresponding to the wear 70% of the tire in the tire radial direction. Thus, although the height of the notch portion 23K does not change until the wear of the tire reaches 5%, the height decreases continuously as the wear of the tire changes from 5% or smaller until the wear of the tire reaches 70%. That is, the height of the notch portion 23K decreases continuously from a height corresponding to 5% of wear of the tire to a height corresponding to 70% of wear of the tire.

The ratio DK/DB of the depth DK of the notch portion 23K to the groove depth DB of the circumferential main groove 22A to which the notch portion 23K is connected is preferably 0.50 or greater and 0.80 or smaller. If the ratio DK/DB is a value within this range, uneven wear resistance performance and drainage performance are improved.

The angle $\alpha$ of the notch portion 23K with respect to the normal line of the tread contact surface 220 is preferably greater than 0° and equal to or less than 45°. If the angle is within this range, uneven wear resistance performance is improved. The angle $\alpha$ is more preferably 20° or greater and 40° or smaller.

The ratio DG/DK of the depth DG of the shallow groove portion 23G to the depth DK of the notch portion 23K to which the shallow groove portion 23G is connected is greater than 0 and equal to or smaller than 0.2. If the ratio DG/DK is a value in this range, uneven wear resistance performance and drainage performance are improved. The ratio DG/DK is more preferably 0.02 or greater and 0.18 or smaller.

The ratio LK/LG of the length LK in the tire width direction of the planar portion of the bottom portion of the notch portion 23K to the length LG in the tire width direction of the shallow groove portion 23G is greater than 0 and equal to or smaller than 0.5. If the ratio LK/LG is a value in this range, uneven wear resistance performance is improved. The ratio LK/LG is more preferably 0.05 or greater and 0.50 or smaller and furthermore preferably 0.1 or greater and 0.3 or smaller.

Note that although the notch portion 23K connected to the circumferential main groove 22A has been described, a similar configuration is applied to the notch portion 23K and the shallow groove portion 23G connected to the circumferential main groove 22B.

Outer Circumferential Main Grooves

Figure 6:
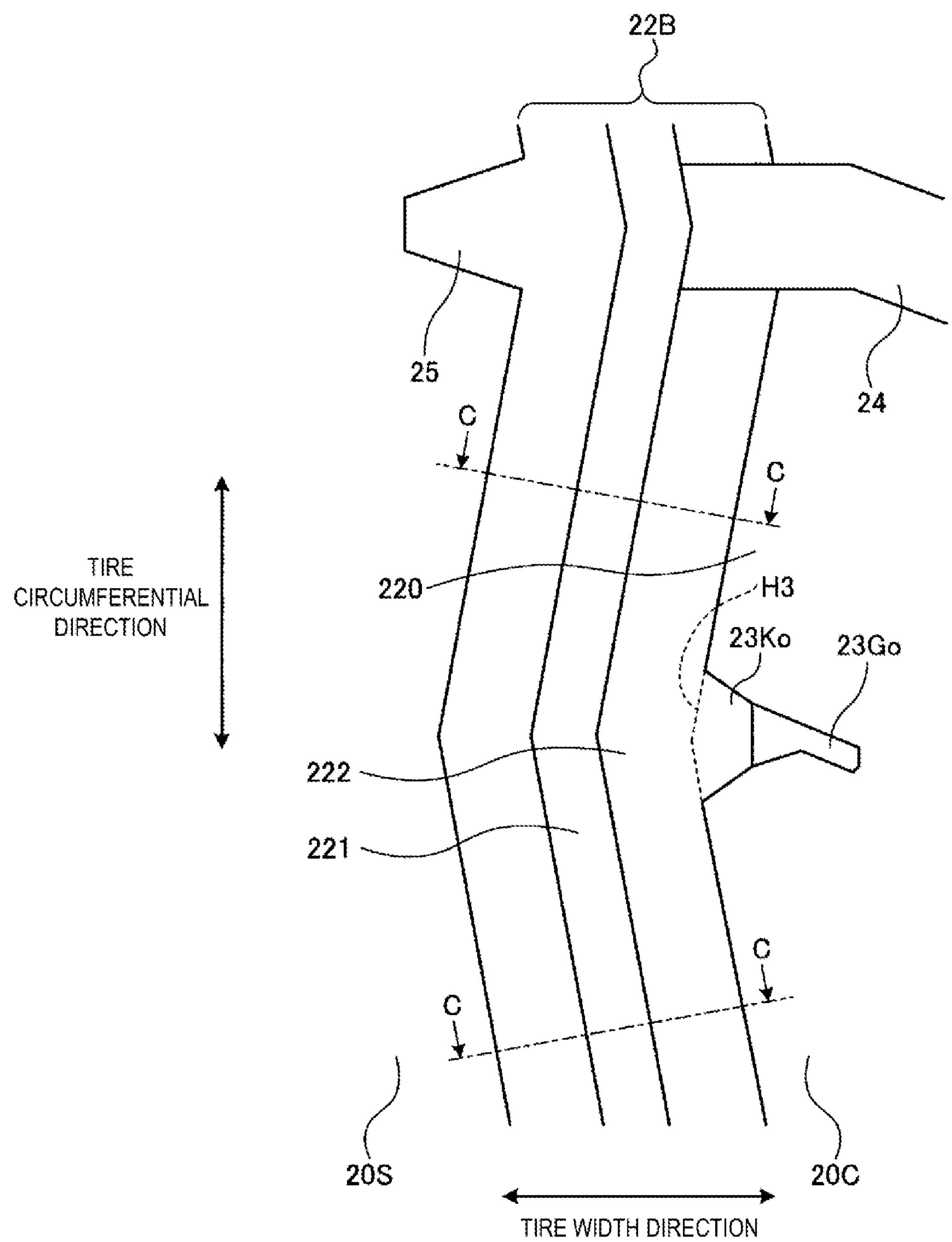
FIG. 6 is a plan view illustrating a detailed configuration of an outer circumferential main groove.

FIG. 6 is a plan view illustrating a detailed configuration of the circumferential main groove 22B which is an outer circumferential main groove. FIG. 6 is an enlarged view of the region 27 in FIG. 2. As illustrated in FIG. 6, the circumferential main groove 22B extends in the tire circumferential direction. Among the land portions on both sides of the circumferential main groove 22B, the land portion 20C is on the side closer to the tire equator line CL and the land portion 20S is on the side farther from the tire equator line CL.

In this example, the circumferential main groove 22B has a zigzag shape that bends at the side closer to the tire equator line CL and the side farther from the tire equator line CL. The circumferential main groove 22B is connected to the lug groove 24 or the notch portion 23Ko in the zigzag-shaped bent portion. The land portion 20S facing the connection portion between the circumferential main groove 22B and the lug groove 24 has a notch portion 25. The notch portion 25 terminates in the land portion 20S.

The land portion 20C includes the notch portion 23Ko connected to the circumferential main groove 22B and the shallow groove portion 23Go connected to the notch portion 23Ko and terminating in the land portion 20C. Note that a dashed line H3 is an imaginary line of the circumferential main groove 22B when the circumferential main groove 22B is viewed in a plan view.

The circumferential main groove 22B has the step portion 222 between the tread contact surface 220 and the groove bottom portion 221. The step portion 222 extends in the tire circumferential direction except for the connecting portions of the circumferential main grooves 22B and the lug grooves 24.

Figure 7:
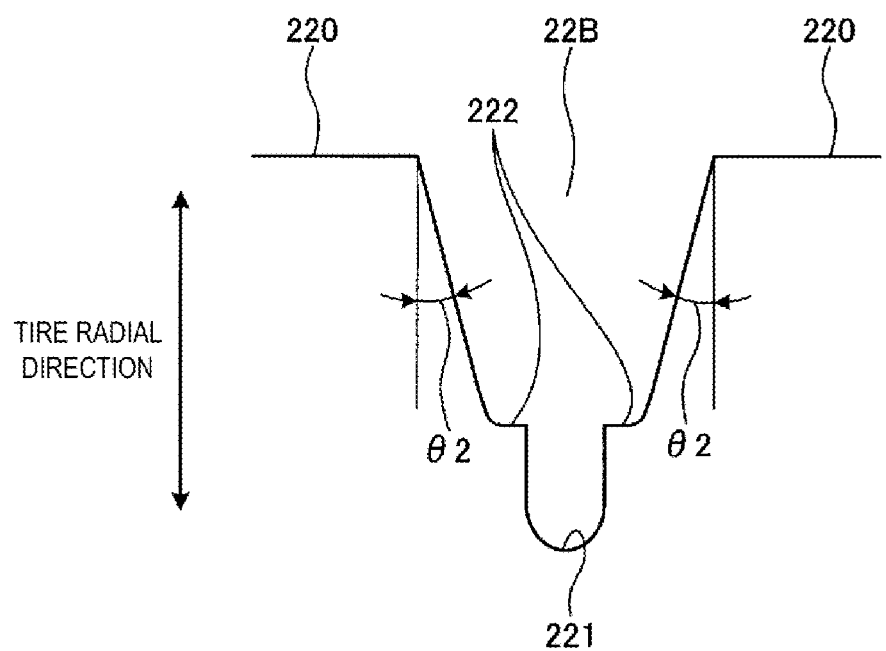
FIG. 7 is a cross-sectional view along line C-C in FIG. 6.

FIG. 7 is a diagram illustrating the structure of the circumferential main groove 22B. FIG. 7 is a cross-sectional view along line C-C in FIG. 6. As illustrated in FIG. 7, a step portion 222 is provided in the circumferential main groove 22B between the tread contact surface 220 and the groove bottom portion 221. Note that in the groove wall from the tread contact surface 220 to the step portion 222, the angle θ2 with respect to the normal line of the tread contact surface 220 is, for example, 15°.

Width of Land Portion and Length of Notch Portion and Shallow Groove Portion

Figure 8:
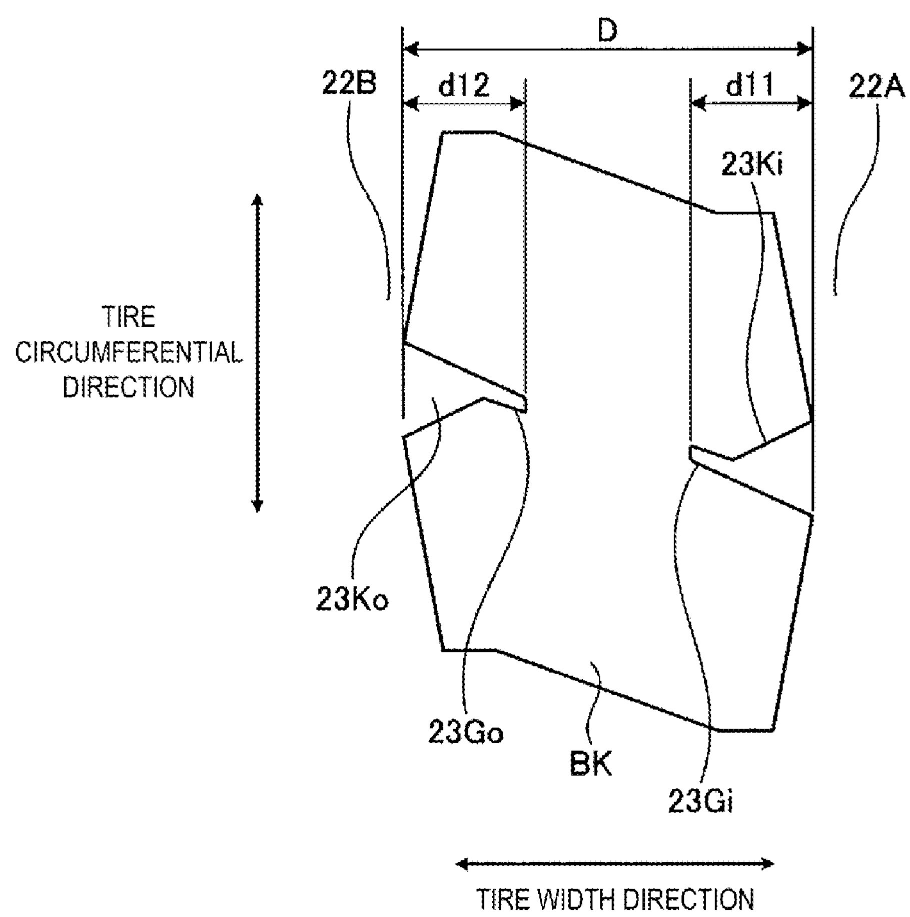
FIG. 8 is an enlarged view of the block in FIG. 2.

FIG. 8 is an enlarged view of the block BK in FIG. 2. In FIG. 8, the distance in the tire width direction between the end portion of the inner notch portion 23Ki close to the inner circumferential main groove 22A and the end portion of the outer notch portion 23Ko close to the outer circumferential main groove 22B is defined as the distance D. The distance D is identical to the width in the tire width direction of the land portion 20C which is the first land portion.

The distance in the tire width direction from the end portion of the inner notch portion 23Ki close to the inner circumferential main groove 22A to the terminating end portion of the inner shallow groove portion 23Gi connected to the inner notch portion 23Ki is defined as the distance d11. The distance d11 is the length in the tire width direction of the inner notch portion 23Ki and the inner shallow groove portion 23Gi. In this case, the ratio dl/D of the distance d11 to the distance D is preferably 0.1 or greater and 0.3 or smaller. If the ratio d11/D is 0.1 or greater and 0.3 or smaller, uneven wear resistance performance is improved. The ratio d11/D is more preferably 0.2.

Additionally, the distance in the tire width direction from the end portion of the outer notch portion 23Ko close to the outer circumferential main groove 22B to the terminating end portion of the outer shallow groove portion 23Go connected to the outer notch portion 23Ko is defined as the distance d12. The distance d12 is the length in the tire width direction of the outer notch portion 23Ko and the outer shallow groove portion 23Go. In this case, the ratio d12/D of the distance d12 to the distance D is preferably 0.1 or greater and 0.4 or smaller. If the ratio d12/D is 0.1 or greater and 0.4 or smaller, uneven wear resistance performance is improved. The ratio d12/D is more preferably 0.3.

Ground Contact Area of Block and Projected Area of Notch Portion

Figure 9:
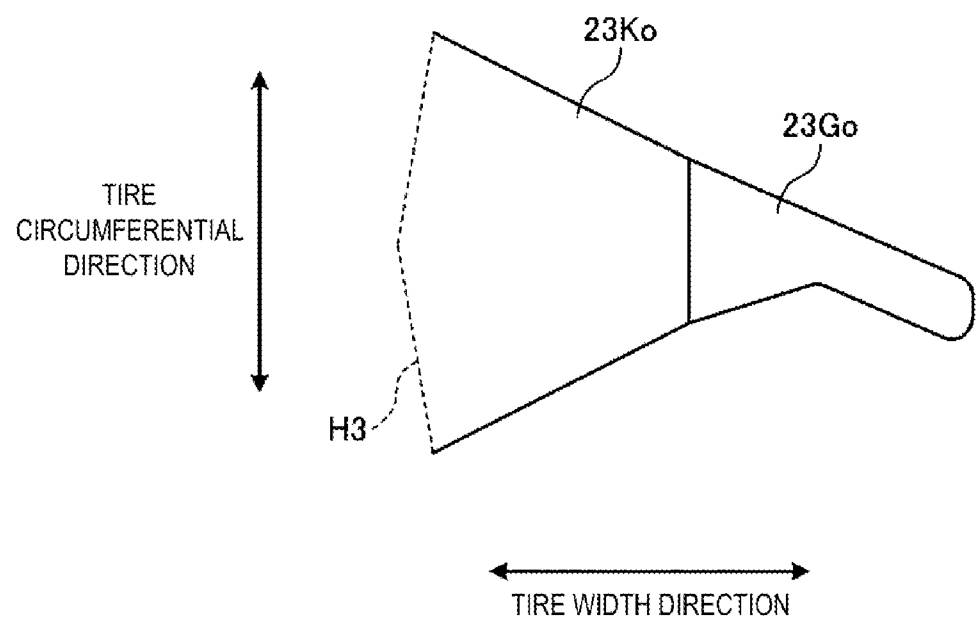
FIG. 9 is an enlarged view of an outer notch portion and an outer shallow groove portion in FIG. 8.

FIG. 9 is an enlarged view illustrating the outer notch portion 23Ko and the outer shallow groove portion 23Go in FIG. 8. In FIG. 9, a dashed line H3 is an imaginary line of the circumferential main groove 22B when the circumferential main groove 22B is viewed in a plan view. In FIG. 9, the projected area of the outer notch portion 23Ko is defined as S2. Additionally, the projected area of the outer shallow groove portion 23Go connected to the outer notch portion 23Ko is defined as S1. The projected area is an area of the tread surface 21 projected from the outer side in the tire radial direction toward the inner side in the tire radial direction.

In this case, the ratio S1/S2 of the projected area S1 to the projected area S2 is preferably 0.1≤S1/S2≤0.5. More preferably, 0.15≤S1/S2≤0.3. If the ratio S1/S2 is smaller than 0.1, the drainage properties will decrease, which is not preferable. If the ratio S1/S2 is greater than 0.5, the ground contact area will decrease and the uneven wear resistance performance will decrease, which is not preferable.

Additionally, the ratio S2/S of the projected area S2 of the outer notch portion 23Ko illustrated in FIG. 9 to the ground contact area S of the block BK illustrated in FIG. 8 is preferably 0<S2/S≤0.1. More preferably, 0.005≤S2/S≤0.100. If the ratio S2/S is greater than 0.100, the ground contact area of the block BK will decrease and uneven wear resistance performance will decrease, which is not preferable.

The "ground contact area S" is the area of a region in the tire width direction and the tire circumferential direction with which the tread surface of the block BK comes into contact when the pneumatic tire 1 is mounted on a regular rim, inflated to a regular internal pressure, and loaded with 70% of a regular load.

Figure 10:
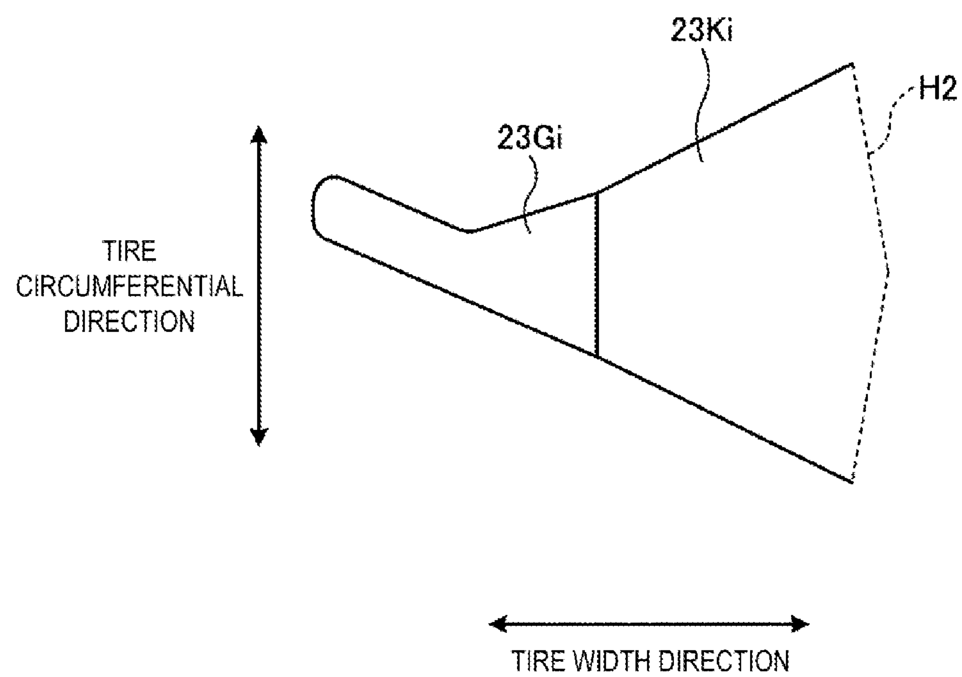
FIG. 10 is an enlarged view of an inner notch portion and an inner shallow groove portion in FIG. 8.

FIG. 10 is an enlarged view illustrating the inner notch portion 23Ki and the inner shallow groove portion 23Gi in FIG. 8. In FIG. 10, a dashed line H2 is an imaginary line of the circumferential main groove 22A when the circumferential main groove 22A is viewed in a plan view. In FIG. 10, the projected area of the inner notch portion 23Ki is defined as S4. The projected area of the inner shallow groove portion 23Gi connected to the inner notch portion 23Ki is defined as S3. In this case, the ratio S3/S4 of the projected area S3 to the projected area S4 is preferably 0.5≤S3/S4≤0.9. More preferably, 0.65≤S3/S4≤0.80. When the ratio S3/S4 is smaller than 0.5, drainage properties will decrease, which is not preferable. If the ratio S3/S4 is greater than 0.9, the ground contact area will decrease and uneven wear resistance performance will decrease, which is not preferable.

Additionally, the ratio S4/S of the projected area S4 of the inner notch portion 23Ki illustrated in FIG. 10 to the ground contact area S of the block BK illustrated in FIG. 8 is preferably from 0<S4/S≤0.1. More preferably, 0.005≤S4/S≤0.100. If the ratio of the projected area of the inner notch portion 23Ki with respect to the ground contact area S of the block BK is greater than 0.100, the ground contact area of the block BK will decrease and uneven wear resistance performance will decrease, which is not preferable.

Misalignment Amount of Arrangement Relative to Pitch Length of Arrangement

Returning to FIG. 2, a plurality of inner notch portions 23Ki and a plurality of inner shallow groove portions 23Gi are arranged in the tire circumferential direction. Additionally, a plurality of outer notch portions 23Ko and a plurality of outer shallow groove portions 23Go are arranged in the tire circumferential direction.

The ratio of the misalignment amount PK of the arrangement of the inner notch portions 23Ki to the pitch length PB1 of the arrangement of the outer notch portions 23Ko is preferably 0.1 or greater and 0.5 or smaller. Additionally, the ratio of misalignment amount PG of the arrangement of the inner shallow groove portions 23Gi to the pitch length PB2 of the arrangement of the outer shallow groove portions 23Go is preferably 0.1 or greater and 0.5 or smaller. By optimizing the arrangement of the inner notch portions 23Ki and the outer notch portions 23Ko and optimizing the arrangement of the inner shallow groove portions 23Gi and the outer shallow groove portions 23Go, uneven wear resistance performance is improved.

Configuration of Adjacent Land Portions

Additionally, in FIG. 2, when focusing on the land portion 20C, which is a first land portion (20-1), the tread portion 2 includes the land portion 20S that is a second land portion (20-2) provided on the outer side in the tire width direction of the outer circumferential main groove 22B and the notch portion 25 that is a second notch portion that is provided in the land portion 20S which is the second land portion (20-2) and terminates in the land portion 20S. By providing the notch portion 25 on the outer side in the tire width direction of the outer circumferential main groove 22B, the edge component increases and drainage properties are improved.

Additionally, when focusing on the land portion 20C which is the first land portion (20-1), the tread portion 2 includes the land portion 20C which is a third land portion (20-3) provided with the inner circumferential main groove 22A disposed therebetween, the notch portion 23Ki which is a third notch portion provided in the land portion 20C and extending in the tire width direction and connected to the inner circumferential main groove 22A, and the shallow groove portion 23G1 connected to the notch portion 23Ki and terminating in the land portion 20C which is the third land portion (20-3). By providing the notch portion 23Ki and the shallow groove portion 23Gi in each of the land portions 20C provided on both sides with the inner circumferential main groove 22A interposed therebetween, the edge component increases and drainage properties are improved.

EXAMPLES

In the examples, performance tests for drainage performance (wet performance and uneven wear resistance performance) were performed on a plurality of types of pneumatic tires of different conditions (see Table 1 to 4). In the performance tests, pneumatic tires (heavy duty pneumatic tires) having a tire size of 11R22.5 were assembled on specified rims, inflated to a specified air pressure, and mounted on a drive shaft of a test vehicle (2-D tractor head).

In the evaluation of drainage performance, the distance until the test vehicle stops on a wet road surface with a water depth of 1 mm after engaging the brakes from the vehicle speed of 40 km/h is measured. The reciprocals of the measurement values of the braking distance are expressed as index values and evaluated with the results of Conventional Example being defined as the reference value (100). In the evaluation, larger index values indicate better drainage performance.

For evaluation of the uneven wear resistance performance, a rim on which the pneumatic tire 1 is mounted is mounted on the drive shaft of the test vehicle, and the amount of heel and toe wear after traveling for 5 million km is measured by the market monitor. The measurement results are expressed as index values and evaluated with the results of the pneumatic tire 1 of Conventional Example being defined as the reference (100). In the evaluation, larger index values indicate better uneven wear resistance performance.

The pneumatic tire of Conventional Example in Table 1 includes the notch portion 23K but does not include the shallow groove portion 23G, the height of the notch portion changes in a step shape, and the ratio DK/DB of the depth of the notch portion to the groove depth of the circumferential main groove is 0.4.

As can be understood from the test results in Tables 1 to 4, the pneumatic tires of Examples have better drainage performance and uneven wear resistance performance.

TABLE 1-1

| | Conventional Example | Example 1 | Example 2 | Example 3 | Example 4 | Example 5 |
|---|---|---|---|---|---|---|
| Presence/absence of notch portion | Yes | Yes | Yes | Yes | Yes | Yes |
| Presence/absence of shallow groove portion | None | Yes | Yes | Yes | Yes | Yes |
| Change in height of notch portion | Step shape | Continuous | Continuous | Continuous | Continuous | Continuous |
| Ratio DK/DB | 0.4 | 0.4 | 0.4 | 0.4 | 0.4 | 0.5 |
| Ratio DG/DK | 0.0 | 0.4 | 0.4 | 0.4 | 0.4 | 0.4 |
| Ratio LK/LG | 0.0 | 0.6 | 0.6 | 0.6 | 0.6 | 0.6 |
| Angle α | — | 50° | 50° | 50° | 50° | 50° |
| Arrangement of notch portion and shallow groove portion | — | Inner side and outer side | Inner side and outer side | Inner side and outer side | Inner side and outer side | Inner side and outer side |
| Ratio S1/S2 | 0.0 | 0.0 | 0.3 | 0.3 | 0.3 | 0.3 |
| Ratio S2/S | 0.0 | 0.0 | 0.0 | 0.0 | 0.006 | 0.006 |
| Ratio S3/S4 | 0.0 | 0.4 | 0.4 | 0.7 | 0.7 | 0.7 |
| Ratio S4/S | 0.0 | 0.0 | 0.0 | 0.0 | 0.006 | 0.006 |
| Ratio d11/D | — | 0.4 | 0.4 | 0.4 | 0.4 | 0.4 |
| Ratio d12/D | — | 0.4 | 0.4 | 0.4 | 0.4 | 0.4 |
| Ratio of misalignment amount of arrangement of notch portions | — | 0.3 | 0.3 | 0.3 | 0.3 | 0.3 |
| Ratio of misalignment amount of arrangement of shallow groove portions | — | 0.3 | 0.3 | 0.3 | 0.3 | 0.3 |
| Presence/absence of second notch portion | — | Yes | Yes | Yes | Yes | Yes |
| Presence/absence of third notch portion and shallow groove portion | — | Yes | Yes | Yes | Yes | Yes |
| Drainage performance (index) | 100 | 103 | 106 | 106 | 106 | 108 |
| Uneven wear resistance performance (index) | 100 | 102 | 104 | 106 | 106 | 106 |

TABLE 1-2

| | Example 6 | Example 7 | Example 8 | Example 9 | Example 10 |
|---|---|---|---|---|---|
| Presence/absence of notch portion | Yes | Yes | Yes | Yes | Yes |
| Presence/absence of shallow groove portion | Yes | Yes | Yes | Yes | Yes |
| Change in height of notch portion | Continuous | Continuous | Continuous | Continuous | Continuous |
| Ratio DK/DB | 0.8 | 0.6 | 0.6 | 0.6 | 0.6 |
| Ratio DG/DK | 0.4 | 0.4 | 0.1 | 0.02 | 0.18 |
| Ratio LK/LG | 0.6 | 0.6 | 0.6 | 0.6 | 0.6 |
| Angle α | 50° | 50° | 50° | 50° | 50° |
| Arrangement of notch portion and shallow groove portion | Inner side and outer side | Inner side and outer side | Inner side and outer side | Inner side and outer side | Inner side and outer side |
| Ratio S1/S2 | 0.3 | 0.3 | 0.3 | 0.3 | 0.3 |
| Ratio S2/S | 0.006 | 0.006 | 0.006 | 0.006 | 0.006 |
| Ratio S3/S4 | 0.7 | 0.7 | 0.7 | 0.7 | 0.7 |
| Ratio S4/S | 0.006 | 0.006 | 0.006 | 0.006 | 0.006 |
| Ratio d11/D | 0.4 | 0.4 | 0.4 | 0.4 | 0.4 |
| Ratio d12/D | 0.4 | 0.4 | 0.4 | 0.4 | 0.4 |
| Ratio of misalignment amount of arrangement of notch portions | 0.3 | 0.3 | 0.3 | 0.3 | 0.3 |
| Ratio of misalignment amount of arrangement of shallow groove portions | 0.3 | 0.3 | 0.3 | 0.3 | 0.3 |
| Presence/absence of second notch portion | Yes | Yes | Yes | Yes | Yes |
| Presence/absence of third notch portion and shallow groove portion | Yes | Yes | Yes | Yes | Yes |
| Drainage performance (index) | 108 | 108 | 108 | 109 | 109 |
| Uneven wear resistance performance (index) | 106 | 109 | 112 | 114 | 114 |

TABLE 2-1

| | Example 11 | Example 12 | Example 13 | Example 14 | Example 15 |
|---|---|---|---|---|---|
| Presence/absence of notch portion | Yes | Yes | Yes | Yes | Yes |
| Presence/absence of shallow groove portion | Yes | Yes | Yes | Yes | Yes |
| Change in height of notch portion | Continuous | Continuous | Continuous | Continuous | Continuous |
| Ratio DK/DB | 0.6 | 0.6 | 0.6 | 0.6 | 0.6 |
| Ratio DG/DK | 0.2 | 0.1 | 0.1 | 0.1 | 0.1 |
| Ratio LK/LG | 0.6 | 0.6 | 0.05 | 0.20 | 0.50 |
| Angle α | 50° | 50° | 50° | 50° | 50° |
| Arrangement of notch portion and shallow groove portion | Inner side and outer side | Inner side and outer side | Inner side and outer side | Inner side and outer side | Inner side and outer side |
| Ratio S1/S2 | 0.3 | 0.3 | 0.3 | 0.3 | 0.3 |
| Ratio S2/S | 0.006 | 0.006 | 0.006 | 0.006 | 0.006 |
| Ratio S3/S4 | 0.7 | 0.7 | 0.7 | 0.7 | 0.7 |
| Ratio S4/S | 0.006 | 0.006 | 0.006 | 0.006 | 0.006 |
| Ratio d11/D | 0.4 | 0.4 | 0.4 | 0.4 | 0.4 |
| Ratio d12/D | 0.4 | 0.4 | 0.4 | 0.4 | 0.4 |
| Ratio of misalignment amount of arrangement of notch portions | 0.3 | 0.3 | 0.3 | 0.3 | 0.3 |
| Ratio of misalignment amount of arrangement of shallow groove portions | 0.3 | 0.3 | 0.3 | 0.3 | 0.3 |
| Presence/absence of second notch portion | Yes | Yes | Yes | Yes | Yes |
| Presence/absence of third notch portion and shallow groove portion | Yes | Yes | Yes | Yes | Yes |
| Drainage performance (index) | 109 | 112 | 112 | 112 | 112 |
| Uneven wear resistance performance (index) | 115 | 112 | 112 | 113 | 110 |

TABLE 2-2

| | Example 16 | Example 17 | Example 18 | Example 19 | Example 20 |
|---|---|---|---|---|---|
| Presence/absence of notch portion | Yes | Yes | Yes | Yes | Yes |
| Presence/absence of shallow groove portion | Yes | Yes | Yes | Yes | Yes |
| Change in height of notch portion | Continuous | Continuous | Continuous | Continuous | Continuous |
| Ratio DK/DB | 0.6 | 0.6 | 0.6 | 0.6 | 0.6 |
| Ratio DG/DK | 0.1 | 0.1 | 0.1 | 0.1 | 0.1 |
| Ratio LK/LG | 0.1 | 0.1 | 0.1 | 0.1 | 0.1 |
| Angle α | 50° | 50° | 50° | 30° | 40° |
| Arrangement of notch portion and shallow groove portion | Inner side and outer side | Inner side and outer side | Inner side and outer side | Inner side and outer side | Inner side and outer side |
| Ratio S1/S2 | 0.3 | 0.3 | 0.3 | 0.3 | 0.3 |
| Ratio S2/S | 0.006 | 0.006 | 0.006 | 0.006 | 0.006 |
| Ratio S3/S4 | 0.7 | 0.7 | 0.7 | 0.7 | 0.7 |
| Ratio S4/S | 0.006 | 0.006 | 0.006 | 0.006 | 0.006 |
| Ratio d11/D | 0.4 | 0.4 | 0.4 | 0.4 | 0.4 |
| Ratio d12/D | 0.4 | 0.4 | 0.4 | 0.4 | 0.4 |
| Ratio of misalignment amount of arrangement of notch portions | 0.3 | 0.6 | 0.3 | 0.3 | 0.3 |
| Ratio of misalignment amount of arrangement of shallow groove portions | 0.3 | 0.5 | 0.3 | 0.3 | 0.3 |
| Presence/absence of second notch portion | Yes | Yes | Yes | Yes | Yes |
| Presence/absence of third notch portion and shallow groove portion | Yes | Yes | Yes | Yes | Yes |
| Drainage performance (index) | 112 | 115 | 115 | 115 | 115 |
| Uneven wear resistance performance (index) | 113 | 113 | 116 | 118 | 118 |

TABLE 3-1

| | Example 21 | Example 22 | Example 23 | Example 24 | Example 25 |
|---|---|---|---|---|---|
| Presence/absence of notch portion | Yes | Yes | Yes | Yes | Yes |
| Presence/absence of shallow groove portion | Yes | Yes | Yes | Yes | Yes |
| Change in height of notch portion | Continuous | Continuous | Continuous | Continuous | Continuous |
| Ratio DK/DB | 0.6 | 0.6 | 0.6 | 0.6 | 0.6 |
| Ratio DG/DK | 0.1 | 0.1 | 0.1 | 0.1 | 0.1 |
| Ratio LK/LG | 0.1 | 0.1 | 0.1 | 0.1 | 0.1 |
| Angle α | 45° | 35° | 35° | 35° | 35° |
| Arrangement of notch portion and shallow groove portion | Inner side and outer side | Inner side and outer side | Outer side only | Inner side only | Inner side and outer side |
| Ratio S1/S2 | 0.3 | 0.3 | 0.3 | 0.3 | 0.1 |
| Ratio S2/S | 0.006 | 0.010 | 0.010 | 0.010 | 0.010 |
| Ratio S3/S4 | 0.7 | 0.7 | 0.7 | 0.7 | 0.7 |
| Ratio S4/S | 0.006 | 0.010 | 0.010 | 0.010 | 0.010 |
| Ratio d11/D | 0.4 | 0.4 | 0.4 | 0.4 | 0.4 |
| Ratio d12/D | 0.4 | 0.4 | 0.4 | 0.4 | 0.4 |
| Ratio of misalignment amount of arrangement of notch portions | 0.3 | 0.3 | 0.3 | 0.3 | 0.3 |
| Ratio of misalignment amount of arrangement of shallow groove portions | 0.3 | 0.3 | 0.3 | 0.3 | 0.3 |
| Presence/absence of second notch portion | Yes | Yes | Yes | Yes | Yes |
| Presence/absence of third notch portion and shallow groove portion | Yes | Yes | Yes | Yes | Yes |
| Drainage performance (index) | 115 | 115 | 114 | 114 | 114 |
| Uneven wear resistance performance (index) | 118 | 120 | 120 | 120 | 120 |

TABLE 3-2

| | Example 26 | Example 27 | Example 28 | Example 29 | Example 30 |
|---|---|---|---|---|---|
| Presence/absence of notch portion | Yes | Yes | Yes | Yes | Yes |
| Presence/absence of shallow groove portion | Yes | Yes | Yes | Yes | Yes |
| Change in height of notch portion | Continuous | Continuous | Continuous | Continuous | Continuous |
| Ratio DK/DB | 0.6 | 0.6 | 0.6 | 0.6 | 0.6 |
| Ratio DG/DK | 0.1 | 0.1 | 0.1 | 0.1 | 0.1 |
| Ratio LK/LG | 0.1 | 0.1 | 0.1 | 0.1 | 0.1 |
| Angle α | 35° | 35° | 35° | 35° | 35° |
| Arrangement of notch portion and shallow groove portion | Inner side and outer side | Inner side and outer side | Inner side and outer side | Inner side and outer side | Inner side and outer side |
| Ratio S1/S2 | 0.5 | 0.15 | 0.3 | 0.3 | 0.3 |
| Ratio S2/S | 0.010 | 0.010 | 0.010 | 0.005 | 0.010 |
| Ratio S3/S4 | 0.7 | 0.7 | 0.7 | 0.7 | 0.5 |
| Ratio S4/S | 0.010 | 0.010 | 0.010 | 0.005 | 0.010 |
| Ratio d11/D | 0.4 | 0.4 | 0.4 | 0.4 | 0.4 |
| Ratio d12/D | 0.4 | 0.4 | 0.4 | 0.4 | 0.4 |
| Ratio of misalignment amount of arrangement of notch portions | 0.3 | 0.3 | 0.3 | 0.3 | 0.3 |
| Ratio of misalignment amount of arrangement of shallow groove portions | 0.3 | 0.3 | 0.3 | 0.3 | 0.3 |
| Presence/absence of second notch portion | Yes | Yes | Yes | Yes | Yes |
| Presence/absence of third notch portion and shallow groove portion | Yes | Yes | Yes | Yes | Yes |
| Drainage performance (index) | 116 | 116 | 116 | 115 | 116 |
| Uneven wear resistance performance (index) | 118 | 119 | 120 | 120 | 120 |

TABLE 4-1

| | Example 31 | Example 32 | Example 33 | Example 34 | Example 35 |
|---|---|---|---|---|---|
| Presence/absence of notch portion | Yes | Yes | Yes | Yes | Yes |
| Presence/absence of shallow groove portion | Yes | Yes | Yes | Yes | Yes |
| Change in height of notch portion | Continuous | Continuous | Continuous | Continuous | Continuous |
| Ratio DK/DB | 0.6 | 0.6 | 0.6 | 0.6 | 0.6 |
| Ratio DG/DK | 0.1 | 0.1 | 0.1 | 0.1 | 0.1 |
| Ratio LK/LG | 0.1 | 0.1 | 0.1 | 0.1 | 0.1 |
| Angle α | 35° | 35° | 35° | 35° | 35° |
| Arrangement of notch portion and shallow groove portion | Inner side and outer side | Inner side and outer side | Inner side and outer side | Inner side and outer side | Inner side and outer side |
| Ratio S1/S2 | 0.3 | 0.3 | 0.3 | 0.3 | 0.3 |
| Ratio S2/S | 0.010 | 0.100 | 0.100 | 0.100 | 0.100 |
| Ratio S3/S4 | 0.9 | 0.7 | 0.7 | 0.7 | 0.7 |
| Ratio S4/S | 0.010 | 0.100 | 0.100 | 0.100 | 0.100 |
| Ratio d11/D | 0.4 | 0.4 | 0.1 | 0.2 | 0.3 |
| Ratio d12/D | 0.4 | 0.4 | 0.1 | 0.3 | 0.4 |
| Ratio of misalignment amount of arrangement of notch portions | 0.3 | 0.3 | 0.3 | 0.3 | 0.3 |
| Ratio of misalignment amount of arrangement of shallow groove portions | 0.3 | 0.3 | 0.3 | 0.3 | 0.3 |
| Presence/absence of second notch portion | Yes | Yes | Yes | Yes | Yes |
| Presence/absence of third notch portion and shallow groove portion | Yes | Yes | Yes | Yes | Yes |
| Drainage performance (index) | 116 | 116 | 116 | 116 | 116 |
| Uneven wear resistance performance (index) | 118 | 121 | 122 | 123 | 122 |

TABLE 4-2

| | Example 36 | Example 37 | Example 38 | Example 39 | Example 40 |
|---|---|---|---|---|---|
| Presence/absence of notch portion | Yes | Yes | Yes | Yes | Yes |
| Presence/absence of shallow groove portion | Yes | Yes | Yes | Yes | Yes |
| Change in height of notch portion | Continuous | Continuous | Continuous | Continuous | Continuous |
| Ratio DK/DB | 0.6 | 0.6 | 0.6 | 0.6 | 0.6 |
| Ratio DG/DK | 0.1 | 0.1 | 0.1 | 0.1 | 0.1 |
| Ratio LK/LG | 0.1 | 0.1 | 0.1 | 0.1 | 0.1 |
| Angle α | 35° | 35° | 35° | 35° | 35° |
| Arrangement of notch portion and shallow groove portion | Inner side and outer side | Inner side and outer side | Inner side and outer side | Inner side and outer side | Inner side and outer side |
| Ratio S1/S2 | 0.3 | 0.3 | 0.3 | 0.3 | 0.3 |
| Ratio S2/S | 0.100 | 0.100 | 0.100 | 0.100 | 0.100 |
| Ratio S3/S4 | 0.7 | 0.7 | 0.7 | 0.7 | 0.7 |
| Ratio S4/S | 0.100 | 0.100 | 0.100 | 0.100 | 0.100 |
| Ratio d11/D | 0.2 | 0.2 | 0.2 | 0.2 | 0.2 |
| Ratio d12/D | 0.3 | 0.3 | 0.3 | 0.3 | 0.3 |
| Ratio of misalignment amount of arrangement of notch portions | 0.1 | 0.5 | 0.3 | 0.3 | 0.3 |
| Ratio of misalignment amount of arrangement of shallow groove portions | 0.1 | 0.5 | 0.3 | 0.3 | 0.3 |
| Presence/absence of second notch portion | Yes | Yes | None | Yes | Yes |
| Presence/absence of third notch portion and shallow groove portion | Yes | Yes | Yes | None | Yes |
| Drainage performance (index) | 116 | 116 | 116 | 114 | 118 |
| Uneven wear resistance performance (index) | 123 | 123 | 125 | 123 | 125 |

The invention claimed is:

1. A pneumatic tire, comprising:

two circumferential main grooves extending in a tire circumferential direction and arranged side by side in a tire width direction; and a first land portion defined by the two circumferential main grooves, the two circumferential main grooves comprising an inner circumferential main groove closest to a tire equatorial plane and an outer circumferential main groove provided on an outer side in the tire width direction of the inner circumferential main groove, the first land portion comprising a notch portion extending in the tire width direction and connected to the circumferential main groove and a shallow groove portion connected to the notch portion and terminating in the first land portion, the notch portion being sandwiched between the circumferential main groove and the shallow groove portion in the tire width direction, and a height of the notch portion decreasing continuously toward the circumferential main groove connected thereto; wherein a ratio of a length in the tire width direction of a planar portion of a bottom portion of the notch portion to a length in the tire width direction of the shallow groove portion is greater than 0 and equal to or smaller than 0.5.

2. The pneumatic tire according to claim 1, wherein the height of the notch portion decreases continuously from a height corresponding to 5% of wear of the tire to a height corresponding to 70% of wear of the tire.

3. The pneumatic tire according to claim 1, wherein a ratio of a depth of the notch portion to a groove depth of the circumferential main groove connected thereto is 0.50 or greater and 0.80 or smaller, and a ratio of a depth of the shallow groove portion to a depth of the notch portion connected thereto is greater than 0 and equal to or smaller than 0.2.

4. The pneumatic tire according to claim 1, wherein an angle of the notch portion with respect to a normal line of a tread contact surface is greater than 0° and equal to or less than 45°.

5. The pneumatic tire according to claim 1, wherein the notch portion comprises an inner notch portion extending in the tire width direction and connected to the inner circumferential main groove and an outer notch portion extending in the tire width direction and connected to the outer circumferential main groove, and the shallow groove portion comprises an inner shallow groove portion connected to the inner notch portion and terminating in the first land portion and an outer shallow groove portion connected to the outer notch portion and terminating in the first land portion.

6. The pneumatic tire according to claim 5, wherein in the outer notch portion and the outer shallow groove portion connected to the outer notch portion, a ratio S1/S2 of a projected area S1 of the outer shallow groove portion to a projected area S2 of the outer notch portion is $0.1 \leq S1/S2 \leq 0.5$.

7. The pneumatic tire according to claim 6, further comprising:

a plurality of width direction grooves provided extending in the tire width direction between the inner circumferential main groove and the outer circumferential main groove; and a block defined by the inner circumferential main groove, the outer circumferential main groove, and the plurality of width direction grooves, a ratio S2/S of the projected area S2 of the outer notch portion to a ground contact area S of the block being $0<S2/S\leq 0.1$.

8. The pneumatic tire according to claim 5, wherein in the inner notch portion and the inner shallow groove portion connected to the inner notch portion, a ratio S3/S4 of a projected area S3 of the inner shallow groove portion to a projected area S4 of the inner notch portion is $0.5\leq S3/S4\leq 0.9$.

9. The pneumatic tire according to claim 8, further comprising:

a plurality of width direction grooves provided extending in the tire width direction between the inner circumferential main groove and the outer circumferential main groove; and a block defined by the inner circumferential main groove, the outer circumferential main groove, and the plurality of width direction grooves, a ratio S4/S of a projected area S4 of the inner notch portion to a ground contact area S of the block being $0<S4/S\leq 0.1$.

10. The pneumatic tire according to claim 5, wherein a ratio d11/D of a distance d11 in the tire width direction from an end portion of the inner notch portion close to the inner circumferential main groove to a terminating end portion of the inner shallow groove portion connected to the inner notch portion to a distance D in the tire width direction between an end portion of the inner notch portion close to the inner circumferential main groove and an end portion of the outer notch portion close to the outer circumferential main groove is 0.1 or greater and 0.3 or smaller, and a ratio d12/D of a distance d12 in the tire width direction from an end portion of the outer notch portion close to the outer circumferential main groove to a terminating end portion of the outer shallow groove portion connected to the outer notch portion to the distance D is 0.1 or greater and 0.4 or smaller.

11. The pneumatic tire according to claim 5, wherein a plurality of inner notch portions and a plurality of inner shallow groove portions are arranged in the tire circumferential direction, a plurality of outer notch portions and a plurality of outer shallow groove portions are arranged in the tire circumferential direction, a ratio of a misalignment amount of an arrangement of the inner notch portions to a pitch length of an arrangement of the outer notch portions is 0.1 or greater and 0.5 or smaller, and a ratio of a misalignment amount of an arrangement of the inner shallow groove portions to a pitch length of an arrangement of the outer shallow groove portions is 0.1 or greater and 0.5 or smaller.

12. The pneumatic tire according to claim 5, further comprising:

a second land portion provided on the outer side in the tire width direction of the outer circumferential main groove;

a second notch portion provided in the second land portion and terminating in the second land portion;

a third land portion provided with the inner circumferential main groove interposed therebetween;

a third notch portion provided in the third land portion extending in the tire width direction and connected to the inner circumferential main groove; and a shallow groove portion connected to the third notch portion and terminating in the third land portion.

13. A pneumatic tire, comprising:

two circumferential main grooves extending in a tire circumferential direction and arranged side by side in a tire width direction; and a first land portion defined by the two circumferential main grooves, the two circumferential main grooves comprising an inner circumferential main groove closest to a tire equatorial plane and an outer circumferential main groove provided on an outer side in the tire width direction of the inner circumferential main groove, the first land portion comprising a notch portion extending in the tire width direction and connected to the circumferential main groove and a shallow groove portion connected to the notch portion and terminating in the first land portion, and a height of the notch portion decreasing continuously toward the circumferential main groove connected thereto; wherein the notch portion comprises an inner notch portion extending in the tire width direction and connected to the inner circumferential main groove and an outer notch portion extending in the tire width direction and connected to the outer circumferential main groove, the shallow groove portion comprises an inner shallow groove portion connected to the inner notch portion and terminating in the first land portion and an outer shallow groove portion connected to the outer notch portion and terminating in the first land portion, and in the outer notch portion and the outer shallow groove portion connected to the outer notch portion, a ratio S1/S2 of a projected area S1 of the outer shallow groove portion to a projected area S2 of the outer notch portion is $0.1\leq S1/S2\leq 0.5$.

14. A pneumatic tire, comprising:

two circumferential main grooves extending in a tire circumferential direction and arranged side by side in a tire width direction; and a first land portion defined by the two circumferential main grooves, the two circumferential main grooves comprising an inner circumferential main groove closest to a tire equatorial plane and an outer circumferential main groove provided on an outer side in the tire width direction of the inner circumferential main groove, the first land portion comprising a notch portion extending in the tire width direction and connected to the circumferential main groove and a shallow groove portion connected to the notch portion and terminating in the first land portion, and a height of the notch portion decreasing continuously toward the circumferential main groove connected thereto; wherein the notch portion comprises an inner notch portion extending in the tire width direction and connected to the inner circumferential main groove and an outer notch portion extending in the tire width direction and connected to the outer circumferential main groove, and the shallow groove portion comprises an inner shallow groove portion connected to the inner notch portion and terminating in the first land portion and an outer shallow groove portion connected to the outer notch portion and terminating in the first land portion, and in the inner notch portion and the inner shallow groove portion connected to the inner notch portion, a ratio S3/S4 of a projected area S3 of the inner shallow groove portion to a projected area S4 of the inner notch portion is 0.5≤S3/S4≤0.9.

* * * * *